United States Patent [19]

Seike

[11] 3,710,226

[45] Jan. 9, 1973

[54] GENERATOR WITH MULTIPLE VOLTAGE REGULATORS

[75] Inventor: Helmut K. Seike, Toledo, Ohio

[73] Assignee: Eltra Corporation, Toledo, Ohio

[22] Filed: March 25, 1971

[21] Appl. No.: 128,027

[52] U.S. Cl. .......................320/15, 320/61, 322/28, 322/94
[51] Int. Cl. ..............................................H02j 7/14
[58] Field of Search..........................320/59-61, 15; 322/28, 59, 94; 321/8

[56] References Cited

UNITED STATES PATENTS

| | | | |
|---|---|---|---|
| 3,379,957 | 4/1968 | Guglielmi | 322/59 X |
| 3,176,212 | 3/1965 | De Puy | 321/8 |
| 3,538,421 | 11/1970 | Young | 322/28 |

Primary Examiner—J. D. Miller
Assistant Examiner—Robert J. Hickey
Attorney—D. Henry Stoltenberg

[57] ABSTRACT

A solid-state series regulator is disclosed which controls the output of one phase of a multiple output three-phase alternator, whose remaining two phases have their output controlled by a solid-state regulator which varies the current to a rotating field exciting the alternator. The alternator is preferably used to charge two standard batteries, the main battery being charged by the two cooperating phases of the alternator whose output is controlled by the regulator for the field, while the auxiliary battery is charged by the third separate phase regulated by the solid-state series regulator. The two batteries are connected in series and connected to loads requiring different voltages.

3 Claims, 3 Drawing Figures

PATENTED JAN 9 1973 3,710,226

INVENTOR.
HELMUT K. SEIKE
BY
D. Henry Stoltenberg
ATTORNEY

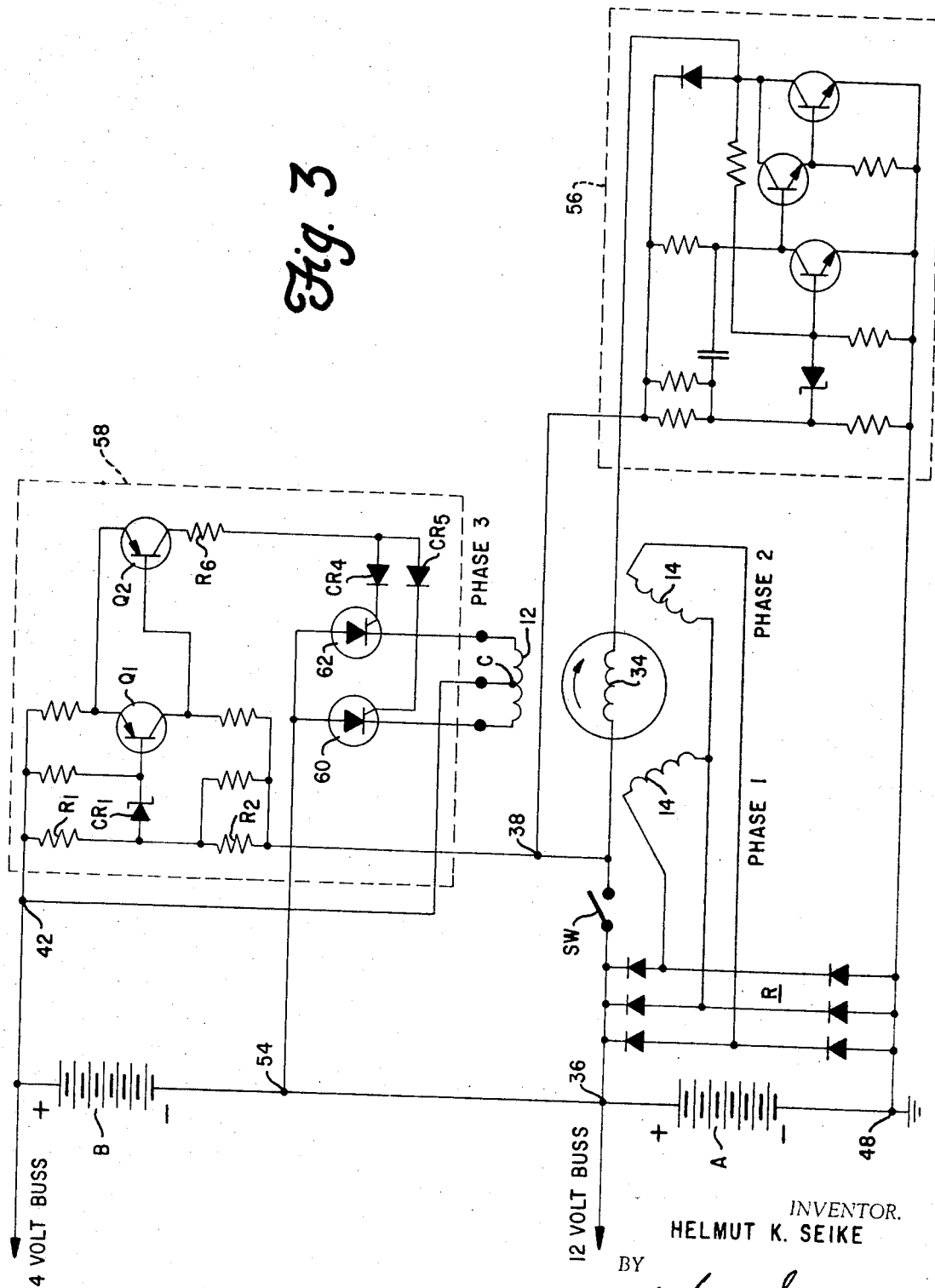

GENERATOR WITH MULTIPLE VOLTAGE REGULATORS

In application Ser. No. 90,899 filed Nov. 19, 1970 and assigned to the same assignee as the present case, a three-phase multiple-output alternator is disclosed and claimed, to which the present invention is applicable. The solid-state series regulator controls the output of a third separate phase which charges the auxiliary battery, which is series connected to the main battery of the system, the main battery being charged by the two remaining cooperating phases of the alternator, the output of which is regulated by a conventional solid-state regulator by controlling the exciting current in the field exciting the rotor of the alternator.

It is therefore a principal object of this invention to provide a solid-state series regulator controlling the output of a third separate phase of a multiple-output alternator whose main output from the two remaining cooperating phases is controlled in a conventional manner by a regulator controlling the field current to the rotating field member.

It is a further object of this invention to provide regulation to an auxiliary power consuming circuit for a multiple-output alternator wherein silicon-controlled rectifiers are used for both rectification and output control.

Other objects and advantages of this invention relating to the arrangement, operation and function of the related elements of the structure, to various details of construction, to combinations of parts and to economies of manufacture will be apparent to those skilled in the art upon consideration of the following description and appended claims, reference being had to the accompanying drawings forming a part of this specification wherein like reference characters designate corresponding parts in the several views.

FIG. 3 is a schematic diagram of connections of the preferred form of the invention.

Figure 1:
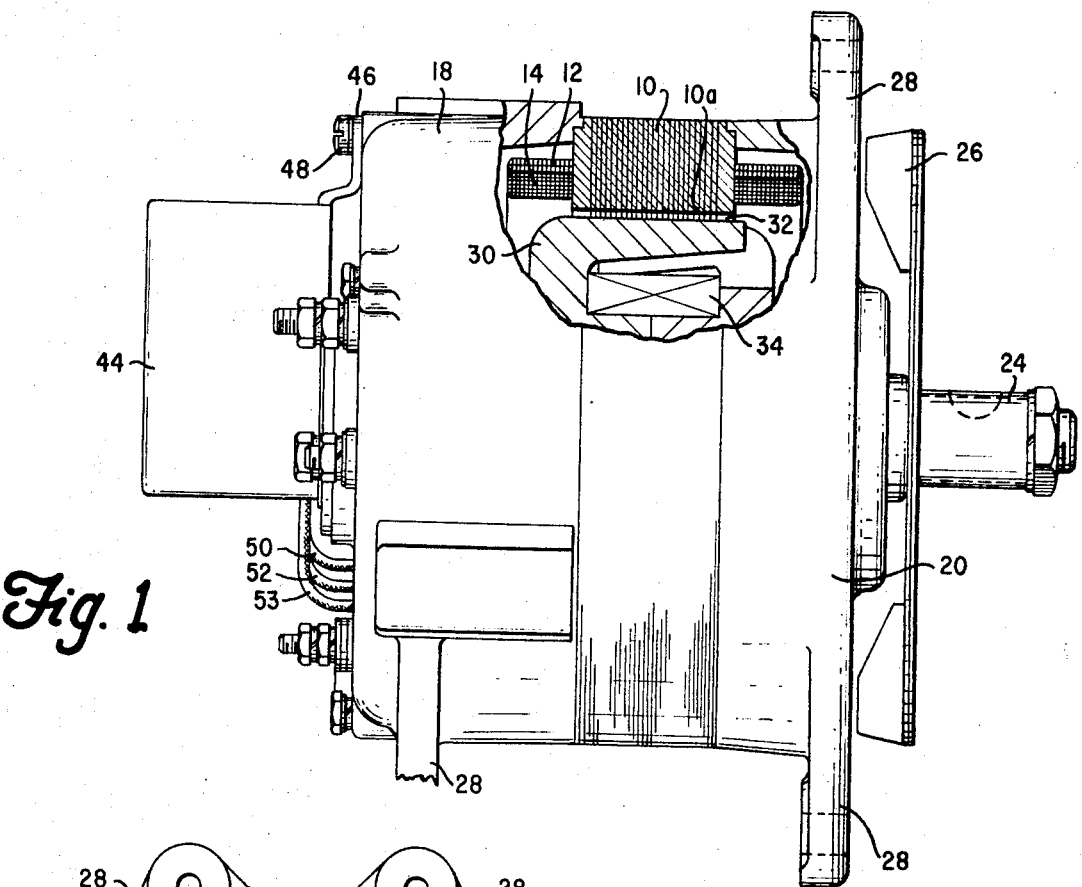
FIG. 1 is an elevational view partly in cross section showing an alternator incorporating the invention.
Figure 2:
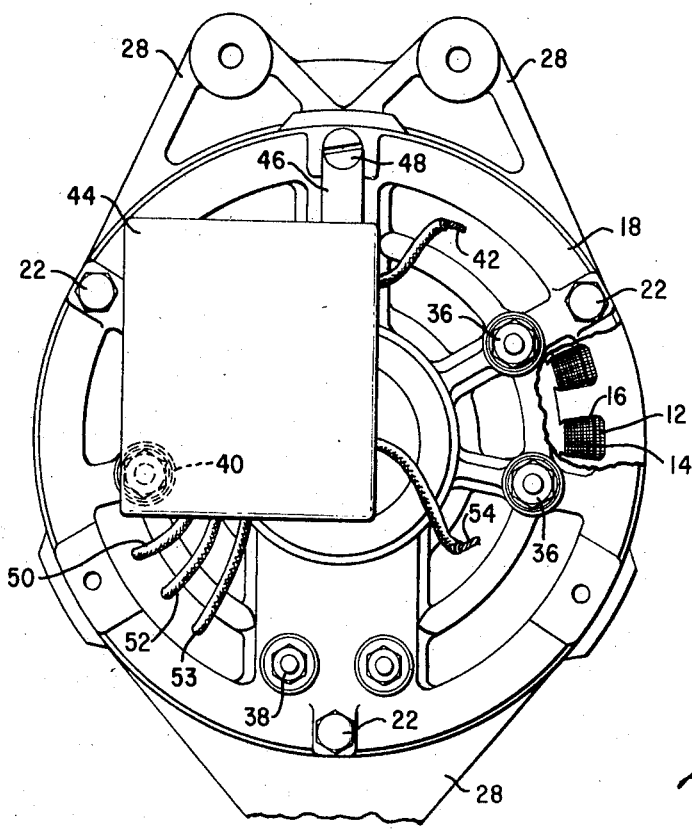
FIG. 2 is an elevational end view of the alternator, partly in section taken from the left end of FIG. 1.

Referring to the drawings, particularly to FIGS. 1 and 2, an alternator is shown having a laminated stator element 10 in which power-producing coils 12 and 14 are mounted in its slots 16 in a conventional manner. It is to be understood that the power coils 12 and 14 may be connected together in various ways as will appear hereinafter, so that a single portion of a power coil may be mounted in a single slot or portions of two or even more coils may be so mounted, depending upon their function in the power circuits.

The stator element 10 is clamped between end heads 18 and 20 by conventional through-bolts 22, the heads being provided with conventional bearings in which is journalled drive shaft 24 protruding from one side of the alternator as shown in FIG. 1, where a conventional drive pulley or other driving member (not shown) may be attached, exteriorly of a cooling fan 26. The end heads 18 and 20 are provided with any suitable mountings lugs 28 whereby the alternator can be mounted in conventional manner on a vehicle in a driven relation with its variable speed engine.

The drive shaft 24 extends through the casing formed by the end heads in concentric relation with the stator element 10, and is provided with a Lundell type rotor 30 rotable within the central aperture 10a of the stator being separated by a small air gap 32. The rotor 30 is provided with a field coil 34 which is capable of being energized by a slip ring and brush arrangement (not shown) in the conventional manner. This provides magnetic excitation for the power coils 12 and 14 on the stator 10 when the rotor 30 is driven by the variable speed engine of the vehicle.

End head 18 is provided with an output terminals 36 and a field terminal 38 which is in circuit with the field coil 34 mounted on the rotor 30 in the manner already described. Regulating means (not shown) of a conventional solid-state semi-conductor type may be mounted inside the alternator casing by bolt 40 cooperating with conventional heat sinks. The regulating means as is well known, controls the direct current to the field coil 34 in such a manner that the voltage appearing at the output terminals 36 is maintained within predetermined limits. A second output wire terminal 42 (FIG. 2) is also provided connected to the second power coil as will be described hereinafter. This output voltage is also regulated by a solid-state type static regulator which incorporates the invention, being mounted in encapsulated state in an external casing 44 mounted by lugs 46 on the outside of the end head 18 by bolts 48. Conductors 50, 52 and 53 extend from the casing 44 to the interior of the alternator to connect the regulator mounted therein to the alternator elements as will appear hereinafter. Terminal bolt 48 provides a negative ground for the alternator.

Referring to FIG. 3, which discloses a schematic diagram of connections of an alternator incorporating the invention, a pair of 12 volt batteries are shown of which battery A is the main battery and battery B is the auxiliary battery. The batteries A and B are connected in series at all times, with the negative of battery A being grounded as at 48 or other point on the common lead. The positive of battery A is connected to a 12 volt buss and to the negative of battery B whose positive is connected to a 24 volt buss. The 12 volt buss supplies power to the main electrical system of the automotive vehicle including ignition, lighting, radio, heater, etc., while the 24 volt buss may supply power to the starter motor of the automotive vehicle or other intermittent 24 volt loads. Various switches, circuit breakers, fuses and so forth that might be required on a particular vehicle have not been shown.

A representative alternator shown in FIG. 3 is a three-phase type, wherein coils 14 are connected as a two-phase winding, while the third phase has a center tap, C, maintained on the stator as a separate winding. Phase 1 and phase 2 are connected to a full wave rectifier R consisting of six silicon rectifiers, the outputs of which are connected from negative ground to positive 12 volts buss, (terminals 48 and 36 respectively) to supply the charging power for battery A and the main electrical system of the vehicle. The field winding 34 which magnetically excites all three phases is connected to the output of the rectifier R in a cooperative relation with the voltage regulator 56 via field terminal 38, whereby a controlled direct current is supplied to the field coil 34 to maintain the voltage of the output of phases 1 and 2 within predetermined limits.

The generated AC voltage across the auxiliary output winding 12, of the alternator is a function of the magnetic field strength and the velocity of the field winding 34. This voltage varies in magnitude and frequency if the field excitation and speed vary. The excitation in turn is a function of the varying main load as the field-regulator 56, attempts to maintain a preset constant output voltage across terminals 36 and 48.

It is therefore necessary to regulate the rectified output voltage of winding 12 of phase 3 to prevent overcharging of the battery B. Since the power demands of the 12V and 24V buss are independent of each other, the regulation characteristics of the auxiliary output must be independent of the regulation characteristics of the field-regulator 56. A series regulator circuit 58 is shown for the auxiliary circuit which operates as follows: when the ignition switch SW is closed the voltage sensing network consisting of resistors $R_1$, $R_2$ and reference-zener diode $CR_1$ is connected across the auxiliary battery B. If the battery's voltage is low, transistor $Q_1$ is cut-off; thus, transistor $Q_2$ is conducting and supplies a positive voltage potential through current limiting resistor $R_6$ and the diodes $CR_4$, $CR_5$ to the gates of the SCR's 60 and 62.

With the alternator running and with a low voltage of battery B, the SCR's will conduct alternately whenever the AC voltage supplied by the auxiliary winding 12 exceeds the DC voltage of the auxiliary battery B. At AC output voltages below this DC level or at standstill of the alternator, the SCR's are reversed biased by battery B and therefore, turned off. This circuit is a gated full-wave rectifier operating in an ON-OFF switching mode.

If the battery B reaches the predetermined voltage level, the breakover voltage of the reference-zener diode $CR_1$ is exceeded. Transistor $Q_1$ will turn on, thus cutting off transistor $Q_2$. This action removes the positive gate potential from both SCR's. They each will then reset as soon as their anode voltage drops below the battery voltage.

The cut-off condition will remain until the voltage of the auxiliary battery B decays below the knee-voltage of the reference diode $CR_1$. Decay of this voltage can be caused either by the natural leakage current of the auxiliary battery B or by a load placed across the +24V buss terminals 42 and 48. The SCR's 60 and 62, therefore, will again be turned on and supply charging current to Battery B.

The selection of the reference voltage of zener $CR_1$ in conjunction with the natural negative base-emitter temperature coefficient of transistor $Q_1$ is such that a predetermined negative temperature slope of the regulated voltage, across terminals 54 and 42 is obtained. That is, the voltage cut-off level of the regulator decreases with increasing ambient temperature.

The diodes $CR_4$, $CR_5$ prevent the application of a reverse voltage to transistor $Q_2$, which would occur because of the AC voltage produced by winding 12.

The system exhibits simplicity, low dissipation losses, and a desirable negative temperature-dependent regulation characteristics necessary for reliable battery charging. Due to its compactness, it can easily be physically mounted in container 44 or combined within the same package as the field regulator circuit 56.

The resistors $R_1$ or $R_2$ can be made variable for convenient adjustment of a chosen charging voltage cut-off level. The auxiliary battery B provides the gate currents for SCR's 60 and 62 through resistor $R_6$ and permits maximum conduction angles of the SCR's. For large conduction angles which are desirable to obtain high average charging currents for battery B, resistor $R_6$ would have to be small in its value. Since the AC output voltage reaches high levels whenever the field winding 34 is fully energized by field regulator 56, because of high load demand across terminals 36 and 48 and at high speeds of the alternator, the current through resistor $R_6$ would become very high causing high losses and would require a higher power handling capacity of transistor $Q_2$. By using the battery as DC trigger instead, this problem is avoided. Thermal safety cut-off switches can be incorporated as optional measures if desirable.

With these parameters for the alternator, the normal electrical power requirements from phases 1 and 2 for a vehicle may be supplied with a total output of 80 amperes at the charging voltage of battery A. If the state of charge of battery B is low, as much as 20 amperes may be generated in phase 3 at the voltage required to charge the battery, which will be subtracted from the output of phases 1 and 2, so that about 60 amperes will be generated in these phases. This is due to the limited amount of magnetizing force generated by the field coil 34 which will be utilized for the magnetic excitation of all three phases. If phase 3 is not utilizing sufficient magnetizing force to generate its maximum output of 20 amperes, that remaining will automatically be available to generate output in phases 1 and 2 if required so as to increase their available power outputs. In this way, an automatic regulation of the division of power between main phases 1 and 2 and the auxiliary phase 3 is attained.

It is to be understood that the above detailed description of the present invention is intended to disclose an embodiment thereof to those skilled in the art, but that the invention is not to be construed as limited in its application to the details of construction and arrangement of parts illustrated in the accompanying drawings since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. In combination with an alternator driven by a variable speed power source in a vehicle having at least two batteries, said alternator having at least two separate generating phases magnetically excited by a field coil, a regulator for supplying power to said field coil to maintain a predetermined voltage in one of the phases to supply a variable load including a first of said batteries, a pair of coils connected in series in the second phase each having a capacity to create comparable AC voltages for charging the second battery, a pair of alternately conducting silicon-controlled rectifiers having their cathodes connected to the ends of the series connected coils with their anodes connected to the negative side of the second battery, the central connected ends of the coils in circuit with the positive side of the battery, a voltage divider across the battery responsive to the voltage of the battery, a zener diode cooperating with the voltage divider to change its conductive state at a predetermined breakover voltage applied thereto by the battery through the voltage divider, and a pair of transistors controlled by the zener diode connected together to maintain opposite states of conduction, one of the transistors connected to the gates of the silicon-controlled rectifiers whereby a positive bias is applied to the gates when the battery voltage is below the predetermined voltage of the zener diode, the bias being removed from the gates when the predetermined voltage for breakover on the zener diode is exceeded causing a reversal of the states of conduction of the transistors, with the bias on the gates removed terminating the conductive period of the silicon-controlled rectifiers at the next following opposing half cycle of the AC output.

2. The regulator defined in claim 1 further characterized by temperature compensation by the negative base-emitter temperature coefficient of the transistor cooperating with the zener diode.

3. The regulator defined in claim 1 further characterized by utilizing variable resistors in the voltage divider to adjust the voltage charging level.

* * * * *